US009641987B2

(12) United States Patent
Aggarwal et al.

(10) Patent No.: US 9,641,987 B2
(45) Date of Patent: May 2, 2017

(54) MULTICAST PACKET RECEPTION RELIABILITY OVER WI-FI

(71) Applicant: Qualcomm Connected Experiences, Inc., San Diego, CA (US)

(72) Inventors: Ashutosh Aggarwal, San Diego, CA (US); Matthew Daniel Smith, San Jose, CA (US); Aaron Michael Pulliam, Poway, CA (US); Clifton Scott, San Diego, CA (US)

(73) Assignee: Qualcomm Connected Experiences, Inc., San Diego, CA (US)

( * ) Notice: Subject to any disclaimer, the term of this patent is extended or adjusted under 35 U.S.C. 154(b) by 142 days.

(21) Appl. No.: 14/698,453

(22) Filed: Apr. 28, 2015

(65) Prior Publication Data
US 2015/0341758 A1 Nov. 26, 2015

Related U.S. Application Data

(60) Provisional application No. 62/002,710, filed on May 23, 2014.

(51) Int. Cl.
H04W 4/00 (2009.01)
H04W 4/06 (2009.01)
H04L 12/18 (2006.01)

(52) U.S. Cl.
CPC ............. *H04W 4/06* (2013.01); *H04L 12/189* (2013.01)

(58) Field of Classification Search
CPC .................................... H04W 28/0284
USPC .......... 370/338, 328, 401, 468, 428
See application file for complete search history.

(56) References Cited

U.S. PATENT DOCUMENTS

| 8,144,707 B2 * | 3/2012 | Zhang | H04L 12/1854 370/328 |
|---|---|---|---|
| 8,937,893 B1 * | 1/2015 | Nemavat | H04W 52/028 370/310 |
| 2005/0009512 A1 * | 1/2005 | Rue | H04L 12/12 455/420 |
| 2005/0221869 A1 * | 10/2005 | Liu | G06F 1/3209 455/574 |
| 2005/0276237 A1 * | 12/2005 | Segal | H04L 12/12 370/312 |
| 2006/0126533 A1 * | 6/2006 | Wang | H04W 8/26 370/254 |
| 2007/0242695 A1 * | 10/2007 | Xu | H04W 48/08 370/468 |
| 2013/0155930 A1 * | 6/2013 | Chu | H04W 52/0206 370/311 |
| 2014/0146734 A1 * | 5/2014 | Katabathuni | H04W 52/0219 370/312 |

* cited by examiner

*Primary Examiner* — Ricky Ngo
*Assistant Examiner* — Dewanda Samuel
(74) *Attorney, Agent, or Firm* — Neugeboren O'Dowd PC

(57) ABSTRACT

To ensure that multicasts from access points sent in response to periodic beacons reach a variety of listening clients that may have longer sleep intervals than an interval between beacons, this disclosure describes systems, methods, and apparatus for multicasting bursts of frames where a burst number is selected so as to be equal to or greater than a range of common sleep intervals. Further, where multicast frames are re-multicast according to known protocols, the repeated bursts can be offset from the re-multicast start time suggested by the protocol, in order to increase a likelihood that clients with especially long sleep intervals receive the multicast frame.

16 Claims, 13 Drawing Sheets

US 9,641,987 B2

MULTICAST PACKET RECEPTION RELIABILITY OVER WI-FI

CROSS REFERENCE TO RELATED APPLICATIONS

The present Application for Patent claims priority to Provisional Application No. 62/002,710 entitled "IMPROVING MULTICAST PACKET RECEPTION RELIABILITY OVER WI-FI" filed May 23, 2014, and assigned to the assignee hereof and hereby expressly incorporated by reference herein.

BACKGROUND

Field of the Disclosure

The present disclosure relates generally to wireless multicast transmissions, and more specifically to increasing the rate of successfully received Wi-Fi or WLAN multicast packets to client devices that have a listen interval exceeding a DTIM interval.

Description of Related Art

Multicast over a wireless network (e.g., Wi-Fi or a wireless local access network (WLAN)) is group communication where a wireless access point (or "AP") sends frames destined for a group of clients (also known as "listening stations" or "destination computers") simultaneously. Unicast over a wireless network is communication where the wireless access point sends frames to a particular client. Beacons or beacon frames are periodically transmitted by the access point to announce the presence of a wireless local access network (or "wireless LAN" or WLAN). Beacons can include information indicating to clients that data is being temporarily stored or buffered on the access point and is ready for transmission to a given client (for unicast transmissions) or to a group of clients (for multicast transmission) (e.g., TIMs or DTIMs). Clients often enter sleep modes in order to conserver power, and select a listen interval or sleep interval that determines how often they wake up to listen for multicast traffic. For unicast data buffered at the access point, a traffic indication map (or "TIM") is sent with each beacon to indicate to sleeping clients that buffered data at the access point is waiting for unicast transmission to the sleeping client. For multicast data buffered at the access point, a delivery traffic indication message (or "DTIM") can be periodically sent with beacons, and indicates whether multicast frames are to be delivered in the upcoming beacon interval. A DTIM can have a lower periodicity than the TIMs (e.g., with every beacon, with every second beacon, with every third beacon, etc.). A DTIM interval indicates the periodicity of the DTIMs and is a parameter of the wireless network (e.g., Wi-Fi or WLAN to name two) and often selected by the access point. An access point may select a DTIM interval based on a tradeoff between latency, buffer size requirements, and power saving. Similarly, a client may select a sleep interval based on a tradeoff between latency, buffer size requirements, and power saving. When buffered data at the access point is waiting for multicast transmission, the next DTIM includes an indication that the multicast data is about to be transmitted. Once the DTIM indicates multicast data is ready for transmission, the access point expects all sleeping clients to awake and listen for the multicast.

SUMMARY

Embodiments disclosed herein address the above stated needs by providing systems, methods, and apparatus for multicasting bursts of frames where a burst number is selected so as to be equal to or greater than a range of common sleep intervals.

One aspect of the disclosure can be characterized as a system configured to control multicasting. The system can include a network interface, a memory, and a burst module. The network interface can be configured to transmit a frame. The memory can be configured to store the frame and a burst number. The burst module can be in communication with the memory and the network interface and can be configured to cause a burst of multicasts of the frame from an access point. Each one of the multicasts can be timed to occur between consecutive delivery traffic indication messages (DTIMs) sent from the access point, the number of multicasts in the burst equal to the burst number.

Another aspect of the disclosure can be characterized as a method for multicasting. The method can include receiving a frame at an access point, where the frame is to be multicast to a group of clients in a network comprising at least the clients and the access point. The method can also include accessing a burst number from a memory. The method can further include multicasting a plurality of delivery traffic indication messages (DTIMs) spaced by a DTIM interval. The method can further include multicasting a burst of the frame by multicasting the frame once after each of at least two DTIMs, where a number of multicast instances in the burst is equal to the burst number.

A further aspect of the disclosure can be characterized as non-transitory, tangible computer readable storage medium, encoded with processor readable instructions to perform a method for multicasting. The method can include sending a frame to an access point, where the frame is to be multicast to a group of clients in a network comprising at least the clients and the access point. The method can also include accessing a burst number from a memory. The method can yet further include multicasting a plurality of delivery traffic indication messages (DTIMs) according to a DTIM interval from the access point. The method can also include multicasting a burst of the frame by multicasting the frame from the access point once after each of at least two DTIMs, where a number of multicast instances in the burst is equal to the burst number.

Yet another aspect of the disclosure can be characterized as an apparatus configured to control multicasting. The apparatus can include means for receiving a frame at an access point, where the frame is to be multicast to a group of clients in a network comprising at least the clients and the access point. The apparatus can further include means for accessing a burst number from a memory. The apparatus can yet further include means for multicasting a plurality of delivery traffic indication messages (DTIMs) from the access point spaced by a DTIM interval. The apparatus further can include means for multicasting from the access point a burst of the frame after each of at least two DTIMs, where the burst includes a number of consecutive multicasts of the frame, the number being equal to the burst number.

DETAILED DESCRIPTION

To receive a multicast, a client must be awake. However, nothing in the 802.11 spec forces clients to wake up as frequently as DTIM beacons are transmitted (e.g., clients can be programmed to sleep for longer than the DTIM interval in order to conserve more power). Some clients are programmed to align their sleep intervals or listen intervals (hereinafter referred to as "sleep intervals") with the DTIM interval and thus awake for every DTIM beacon. However, others are programmed for greater power savings, and are therefore programmed to sleep for longer periods than the DTIM interval, resulting in missed multicasts.

While the system administrator can increase the DTIM interval in order to try and account for clients that have longer sleep intervals, invariably there are situations where one or more clients have a longer sleep interval than the DTIM interval and therefore miss some multicast transmissions. It should be noted that there is no feedback mechanism to inform the access point that such clients are missing multicasts. Thus, clients having longer sleep intervals than the DTIM interval are susceptible to a loss of multicast transmissions.

The following discussion will make use of various timing charts showing multicast transmissions from an access point, and sleep intervals for one or more clients listening to multicasts from the access point. Many of these figures illustrate a beacon period of 100 ms, and the sleep intervals are also selected based on this 100 ms beacon period. Thus, for instance, where this discussion talks about 1.3 s or 1300 ms as representing a thirteenth beacon, in practice, the thirteenth beacon would often occur at 1.3312 s or 1331.2 ms. However, this beacon period and the corresponding sleep intervals are non-limiting and various other beacon periods and sleep intervals can also be used in combination with this disclosure. For instance, this disclosure is equally applicable to beacon periods of 102.4 ms, which is a common standard in Wi-Fi and WLAN multicasting.

Figure 1:
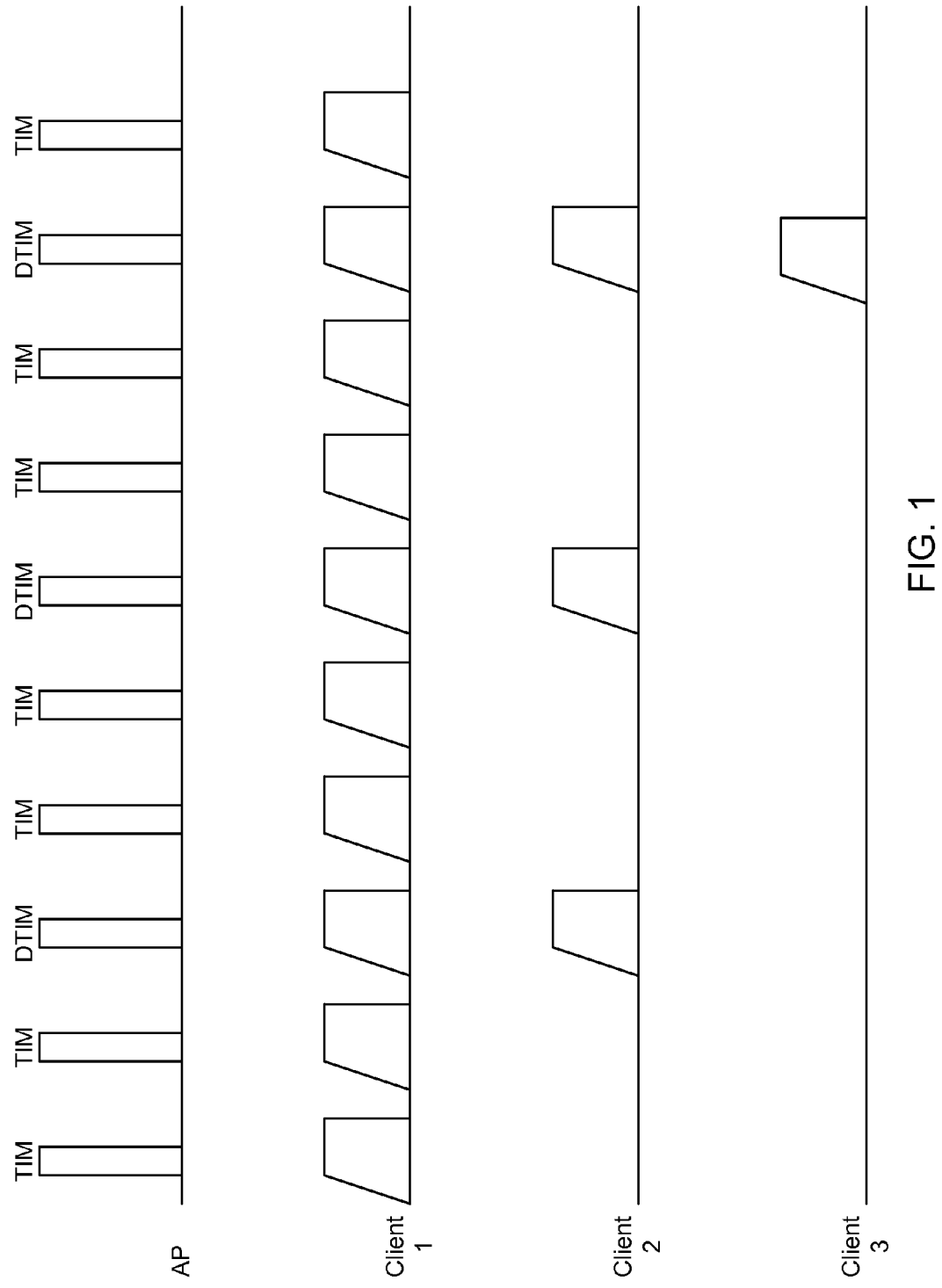
FIG. 1 illustrates an example of a timing chart for an access point having a DTIM interval of three and three clients having sleep intervals of one, three, and ten beacons, respectively.

FIG. 1 illustrates an example of a timing chart for an access point having a DTIM interval of 3 and three clients having sleep intervals of one, three, and ten beacons, respectively. The access point is configured to have a DTIM interval of three and hence DTIMs are sent on the third, sixth, and ninth beacons. Client 1 has a sleep interval of one beacon and thus wakes for every beacon. As a result, Client 1 does not miss a single DTIM multicast and therefore should receive any multicast data buffered at the access point (assuming no inherent multicast losses). Client 1 sacrifices power conservation since it utilizes a sleep interval of one beacon interval. Yet, the inventors have found that in practice few clients use a sleep interval of one to conserve battery power. Client 2 has a sleep interval of three beacons and thus wakes for the third, sixth, and ninth beacons. As a result, Client 2 wakes for each DTIM and, like Client 1, should not miss any multicast data sent. Client 2 also benefits from longer sleep intervals and thus greater power conservation than Client 1. Client 3 has a sleep interval of ten, and reflects a device that is programmed to give great priority to power savings at the cost of missing many multicast data transmissions. Accordingly, FIG. 1 illustrates how different clients can be programmed to balance power savings versus multicast reception efficiency. Some devices, such as Client 3, can prioritize power savings to such an extent that they may miss a large percentage of multicast data. For instance, here, Client 3 has a sleep interval of 9, and therefore misses 2 out of every 3 DTIMs.

Figure 2:
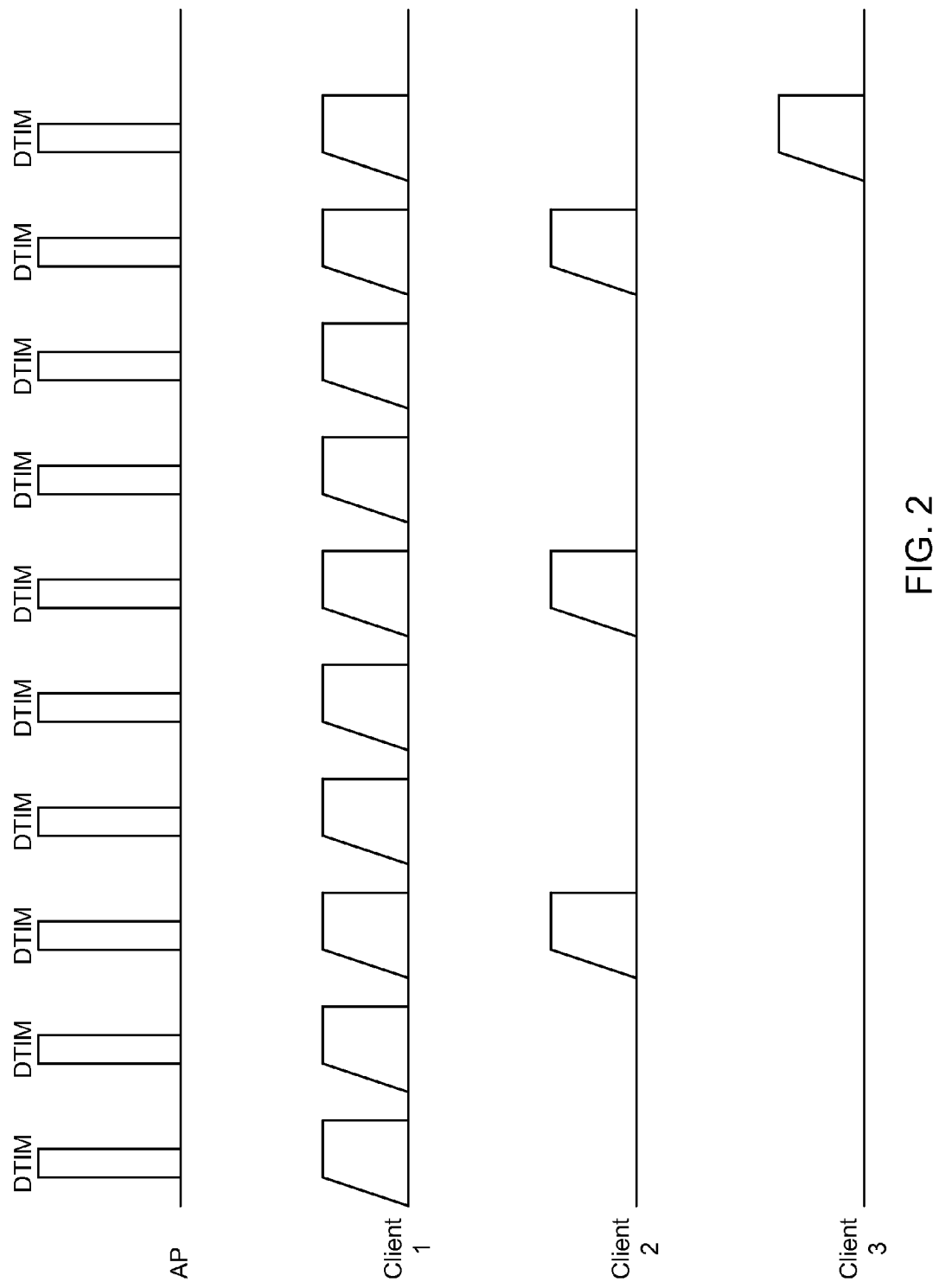
FIG. 2 illustrates an example of a timing chart for an access point having a DTIM interval of 1 and three clients having sleep intervals of one, three, and ten beacons, respectively.

FIG. 2 illustrates an example of a timing chart for an access point having a DTIM interval of 1 and three clients having sleep intervals of one, three, and ten beacons, respectively. Client 1 can be seen to wake up for, or be awake, for each of the ten DTIMs, while Client 2 misses two out of every three DTIMs, and Client 3 misses nine out of every ten DTIMs. Here, where the DTIM interval is one, many clients that utilize a multi-beacon sleep interval in order to conserve power, miss a majority of the multicasts.

The sleep intervals illustrated in FIGS. 1 and 2 were of particular relevance to multicast applications since the inventors have discovered that a large number of clients use sleep intervals of 3 or 10 beacons, with the greatest number using an interval of 3 beacons. Thus, these figures show that a great many clients are missing large percentages of multicast data.

To facilitate higher reception rates for "misbehaving" clients (those having sleep intervals that do not coincide with or are greater than the DTIM interval, such as Clients 2 and 3 in FIG. 2) this disclosure discusses systems, methods, and apparatus for repeating multicast transmissions in a multi-transmission burst (hereinafter referred to as a "burst") such that at least one multicast in a burst is received by nearly all clients regardless of behavior (i.e., regardless of the chosen sleep interval).

FIG. 3 again illustrates a timing chart for an access point having a DTIM interval of 1 and three clients having sleep intervals of one, three, and ten beacons, respectively. However, this timing chart also shows a burst of three multicast frames sent after the first DTIM at 0 ms. Typically only a single multicast frame is sent after a given DTIM. Yet this can lead to missed multicast frames, so the inventors recognized that repeating the multicast in a "burst" greatly increases the chances of each client being awake for a given multicast. The burst in this embodiment includes three instances of the same multicast frame 302, multicast over three consecutive beacons. The advantage of this scheme is that even though Client 2 is asleep during the multicast of the first and second instances 302, 304, of the multicast frame, Client 2 wakes for the third beacon and is thus able to receive the third instance 306 of the multicast frame. In this way, multicasting a burst of the same multicast frame greatly increases the likelihood that a misbehaving client will receive a multicast frame. The result is that clients can be configured to carry out longer sleep intervals and thus greater power savings while still receiving all or nearly all multicasts.

Figure 3:
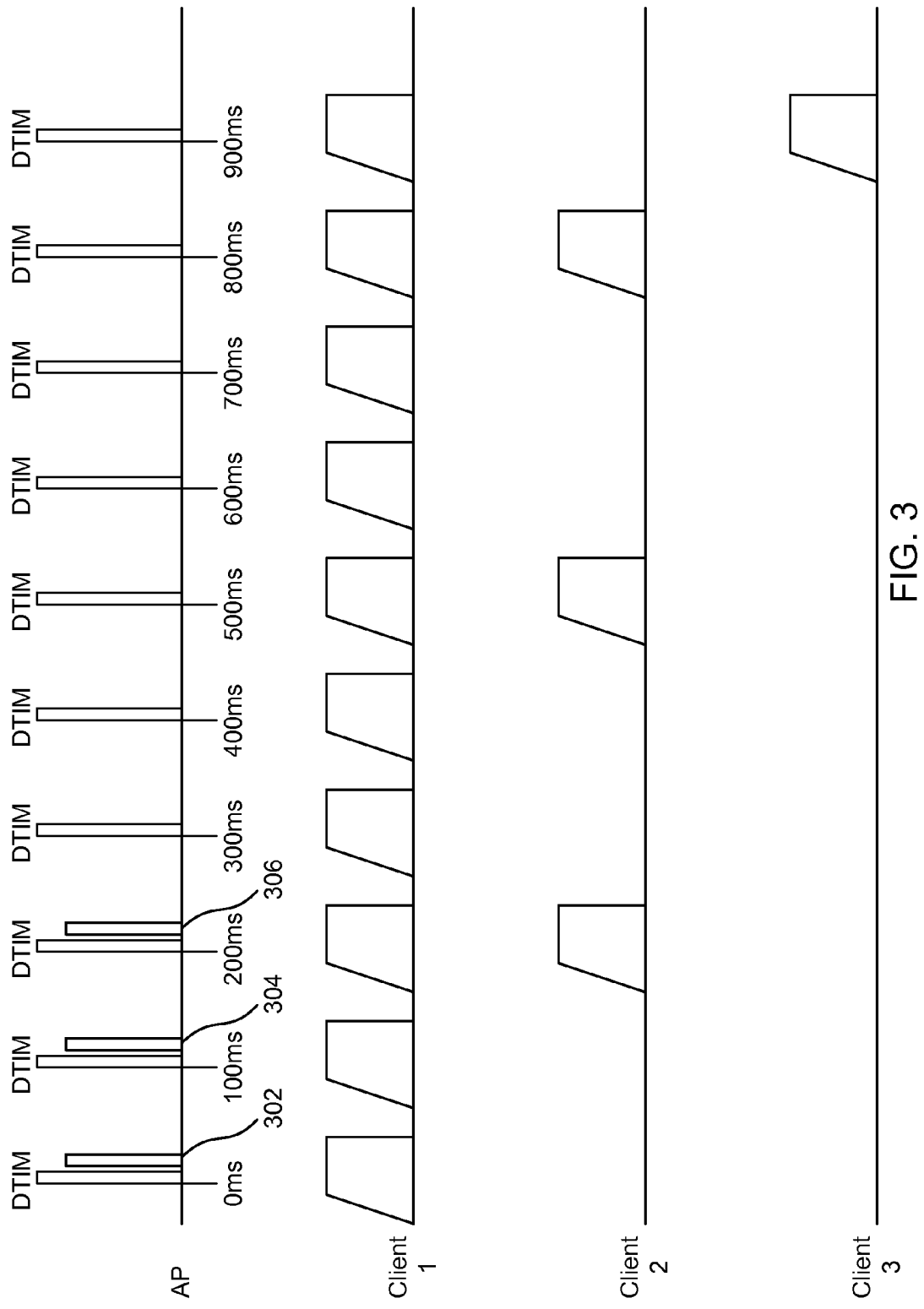
FIG. 3 again illustrates a timing chart for an access point having a DTIM interval of 1 and three clients having sleep intervals of one, three, and ten beacons, respectively.
Figure 4:
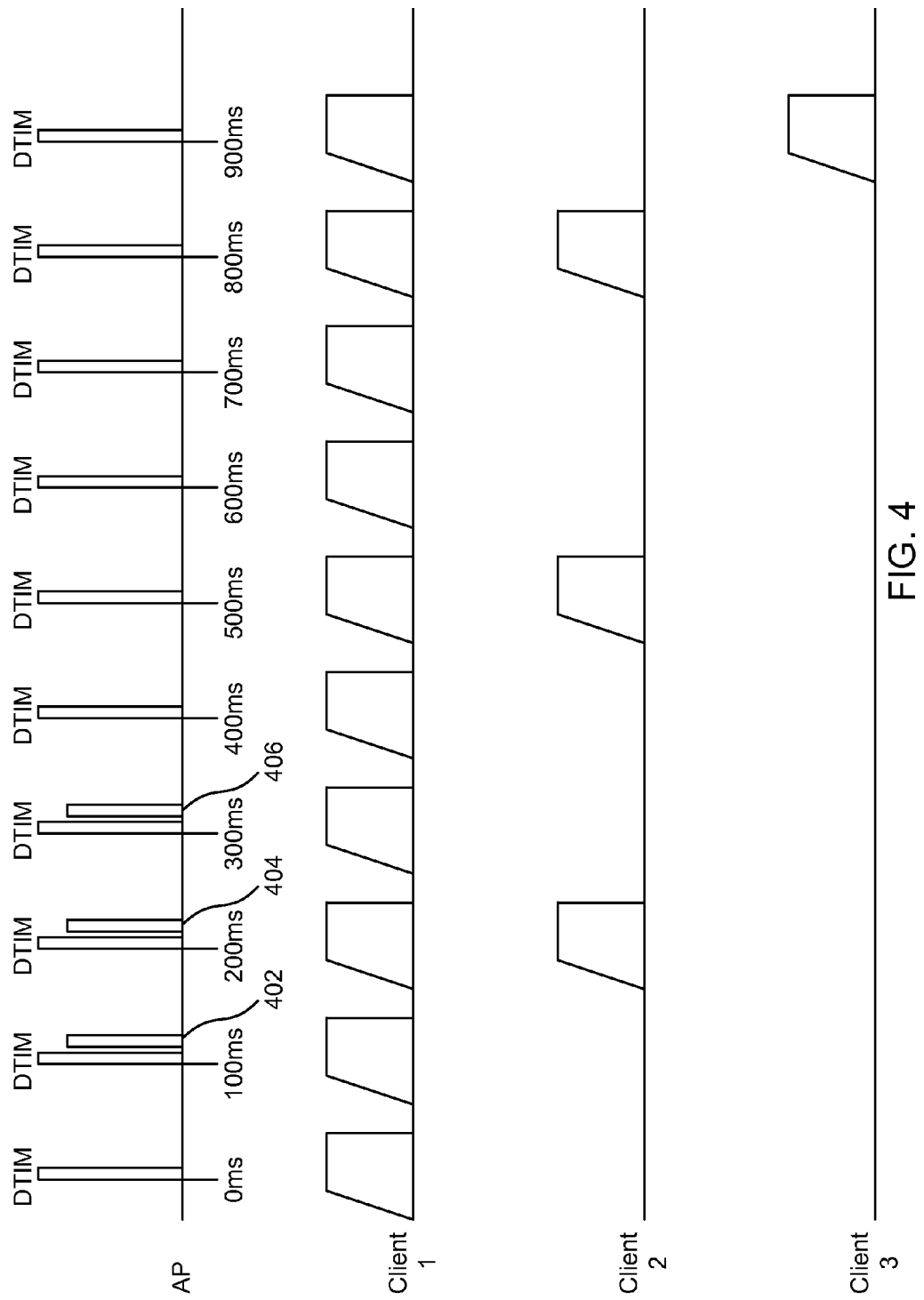
FIG. 4 illustrates the timing chart of FIG. 3, but where the multicast frame is sent at a different time.

FIG. 4 illustrates the timing chart of FIG. 3, but where the multicast frame is sent at a different time, showing that Client 2 still receives the multicast. Here, the multicast burst is sent after the 100 ms DTIM, and as seen the first and third instances 402, 406 of the multicast frame are sent when Client 2 is asleep, but the second instance 404 is sent when Client 2 is awake. Therefore, it can be seen that use of the burst ensures that Client 2 receives the multicast regardless as to the exact beacon after which the first instance of the burst is sent.

Figure 5:
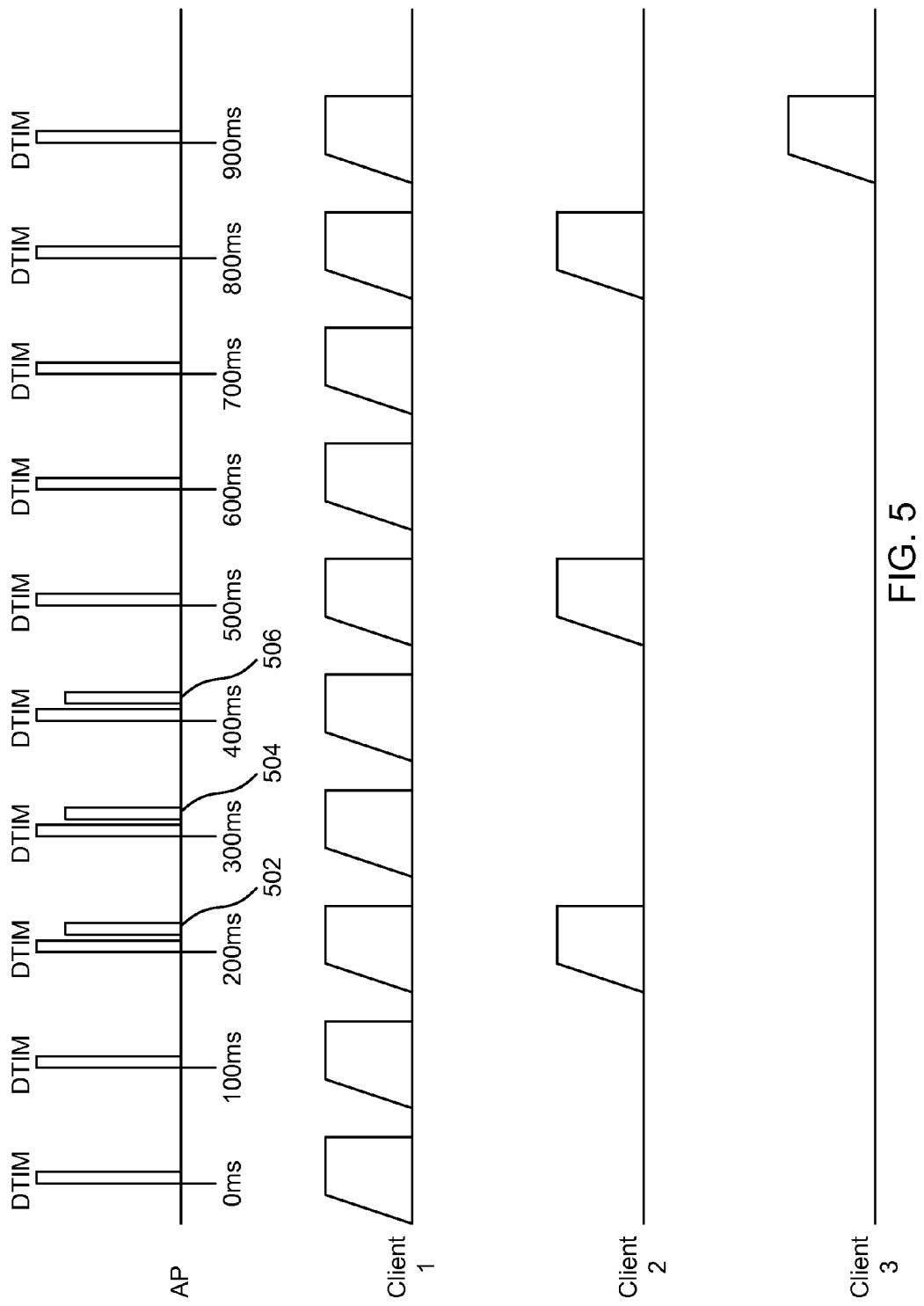
FIG. 5 illustrates the timing chart of FIG. 3, but where the multicast frame is sent at yet another time.

FIG. 5 illustrates the timing chart of FIG. 3, but where the multicast frame is sent at yet another time. Here, the first instance 502 of the multicast frame is received by Client 2 and thus again the burst increases the likelihood that Client 2 will receive a multicast. The second and third instances 504, 506 are not received by Client 2 since Client 2 has returned to a sleep state when these instances of the burst are multicast. This again shows that use of the burst ensures that Client 2 receives the multicast regardless as to the exact beacon after which the first instance of the burst is sent.

From the examples shown in FIGS. 3-5, one can see that using a burst having three consecutive repetitions of the multicast frame ensures that a client having a sleep interval of three or less will receive the multicast frame (assuming no inherent multicast losses). Similarly, a burst of four consecutive repetitions of the multicast frame ensures that a client having a sleep interval of four or less will receive the multicast frame. One of skill in the art can extend this method to target clients having various sleep intervals, such that the number of multicasts in a burst is tailored to a commonly-used sleep interval. In other words, the number of multicast frames in a burst should be greater than or equal to a range of common or the most common sleep intervals used by a plurality of clients, or by a set of preferred clients.

The number of consecutive multicasts of the same frame can be referred to as a "burst number." While FIGS. 3-5 illustrated an embodiment where the burst number was three, one of skill in the art will recognize that other burst numbers may also be implemented. For instance, where the sleep interval of a large number of clients is five, the burst number may be five. Yet, this does not mean that the burst number need equal the sleep interval of the majority of clients. In some cases, the sleep interval of a great number of clients may be four, and yet a burst number of three may be implemented. Further, the burst number may be selected based on consideration of multiple client types (e.g., where some have a first sleep interval and others have a second or third sleep interval) rather than tailoring the burst number to a single sleep interval. In many cases, a burst number of three may be preferred since, for client discovery via multicast, it has been found that a large number of clients utilize a sleep interval of three beacons.

Figure 6:
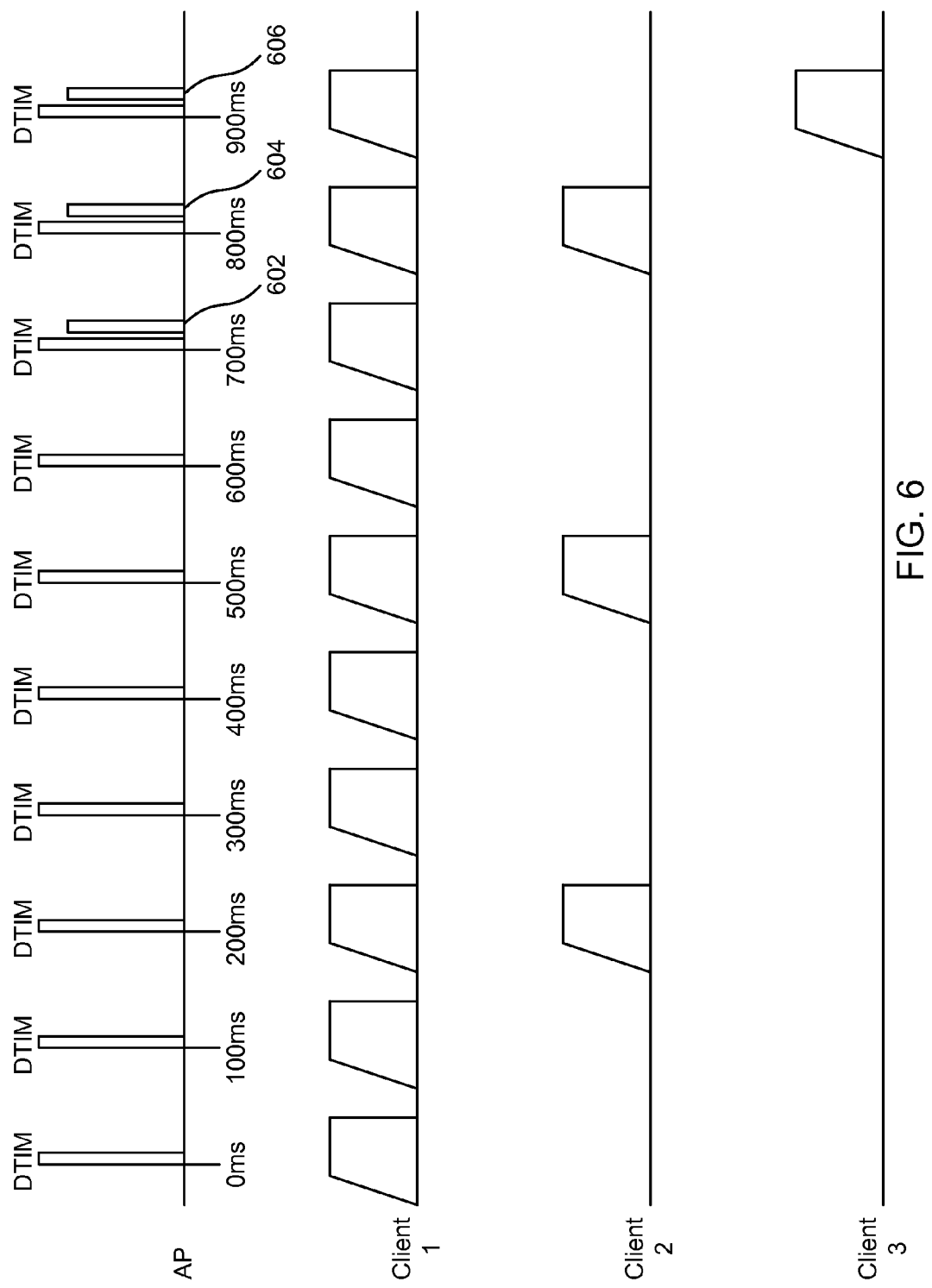
FIG. 6 illustrates a timing chart similar to FIG. 5, but where the multicast frame is transmitted at a time where the burst reaches both Client 2 and 3 while they are awake.

One will also notice that the bursts used in FIGS. 3-5 occur while Client 3 is asleep and therefore in these specific situations, the bursts do not reach Client 3. However, FIG. 6 illustrates a similar timing chart, but where the multicast frame is transmitted at a time where the burst reaches both Client 2 and 3 while they are awake, and where a non-burst multicast would not have reached either of these clients. In particular, the first and second instances 602, 604 do not reach Client 3 while awake, but the third instance 606 is multicast while Client 3 is awake. Thus, by looking at FIGS. 3-6 one sees that even a burst number of three can slightly improve the rate of reception for clients having sleep intervals other than the targeted sleep interval. In other words, while a burst number can be selected to target a first type of client (e.g., having a sleep interval X), the burst number may also increase the reception rate for other types of clients (e.g., those having sleep intervals other than X). To put this another way, using a burst number of 3 given the clients of FIGS. 3-6, enables Clients 1 and 2 to always receive the multicast frame, and in some instances Client 3 will also receive the multicast frame even though its sleep interval is greater than the burst number.

A burst can be controlled or triggered by either a sender device or the access point. When the sender device is the trigger, the sender device transmits a frame to the access point and then consecutively sends duplicates of the frame. The access point merely multicasts the string of replicated frames from the sender device. Thus, the sender device triggers the burst without any input or logic from the access point. On the other hand, the access point can be the trigger. In this case, the sender device sends a single frame to the access point, and the access point multicasts consecutive repetitions of the frame. In this case, the access point comprises the logic to generate a burst. In yet a third embodiment, both the sender device and the access point can both include some logic to generate and multicast a burst. For instance, the sender device can send a string of instances of the same frame, but without being synchronized with beacons or DTIM, and the access point can coordinate timing of the instances of the burst in order to synchronize with the beacons and DTIM. This is just one non-limiting example and other instances of distributing the logic between the sender device and the access point are also possible.

As noted relative to FIG. 6, Client 3 (or any client having a very long sleep interval) may still not be awake to receive the multicast frame even where a burst is used. This challenge can be overcome where the multicast frame is to be repeated for purposes aside from the herein described burst. For instance, certain protocols require that a multicast be repeated such that clients entering the network after a first instance of a multicast can receive the multicast (this repetition is a different repetition than the burst that has so far been described). The purpose of this re-multicast could be to ensure that new clients just entering the network receive the multicast, although this is just one example, and other reasons for re-multicasting can also dictate that such re-multicasting take place. Given this or another reason for multicasts being repeated (or "re-multicasting"), each re-multicasting instance can be sent as a burst (i.e., a repeated burst). Further, existing protocols, such as RFC 6762, provide guidelines that, or dictate that, a particular re-multicasting timing be used. There are also existing implementations that suggest a back-off schedule that accords with RFC 6762 and help give life to the examples described herein. Where this disclosure adds the suggestion of bursts and repeated bursts in accord with the re-multicasting timing, each consecutive burst can also be transmitted with an additional offset from the re-multicasting start times suggested by the protocol (see e.g., FIG. 7).

Figure 7:
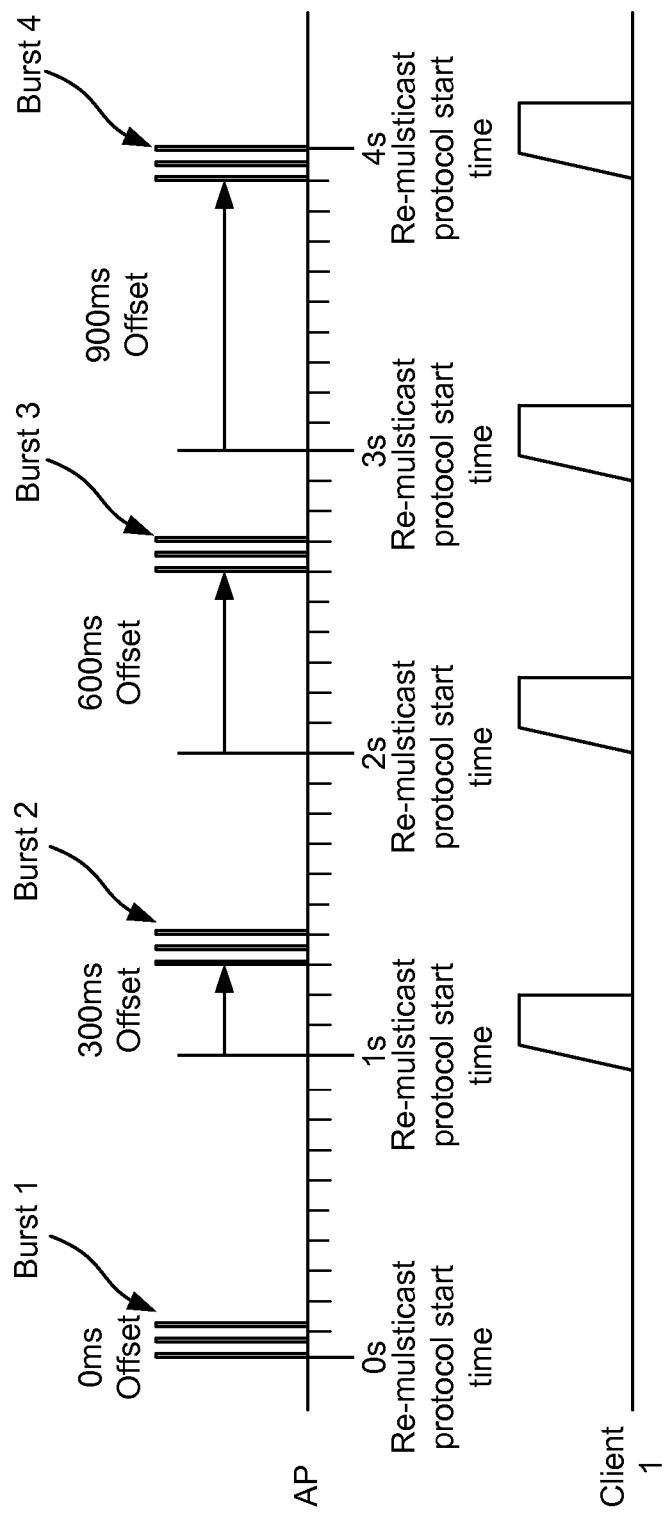
FIG. 7 illustrates a further timing chart showing an increasing offset for subsequent bursts.

FIG. 7 illustrates a timing chart showing an increasing offset for subsequent bursts. In this particular, and non-limiting example, an access point has a DTIM interval of 1, Client 1 has a sleep interval of ten, multicasts in a burst are separated by 100 ms, a re-multicasting protocol requires re-multicasting every 1 s, and the offset for each burst at the re-multicast interval burst is 300 ms*(N−1) where N is a burst instance (e.g., N=1 for Burst 1, N=2 for Bust 2, N=3 for Burst 3, and so on). Despite the highly-specific parameters used in this example, one of skill in the art will recognize that this example is non-limiting and that the method described relative to FIG. 7 can be applied given a variety of alternative parameters. For instance, the DTIM interval, number of clients, sleep interval of those one or more clients, re-multicasting protocol, and the burst offset for each re-multicasting instance can all be varied while still performing the described method.

Unlike FIGS. 1-6, the individual DTIMs are not illustrated (although they are assumed to occur every 100 ms), and the scale has been changed as compared to previous figures such that units of seconds rather than milliseconds are now shown. Thus, the protocol suggests performing a re-multicast at 1 s, 2 s, 3 s, 4 s, etc. until the protocol determines that such activity can cease or according to a fixed number of repeated bursts. At the same time, the multicast is transmitted as a burst as described earlier, and the illustrated burst number is three. Therefore, a burst of three consecutive repetitions of the multicast frame occur starting at 0 s. However, each subsequent burst, or each re-multicast burst, is offset by 300 ms from the previous burst. Were the bursts implemented according to the protocol (without offsets), a burst would occur at 0 s, 1 s, 2 s, 3 s, 4 s, etc (e.g., multicasts would occur at 0.0 s, 0.1 s, 0.2 s, 1.0 s, 1.1 s, 1.2 s, 2.0 s, 2.1 s, 2.2 s, 3.0 s, 3.1 s, 3.2 s, 4.0 s, 4.1 s, and 4.2 s). However, with the offsets of this disclosure being added, each burst is separated by one second (the protocol period for re-multicasting or 1 s) plus the offset (e.g., 300 ms). As such, the illustrated bursts occur as follows: burst 1 starts at 0 s, burst 2 starts at 1.3 s (or 1.3 s after burst 1), burst 3 starts at 2.6 s (or 1.3 s after burst 2), and burst 3 starts at 3.9 s (or 1.3 s after burst 3). Since, burst 3 starts at 3.9 s, and assuming the multicast frames in each burst are separated by 100 ms, the multicast frames in burst 3 occur at 3.9 s, 4.0 s, and 4.1 s. Since Client 1 has a sleep interval of ten, it awakes on the tenth DTIM, or 4.0 s. The third multicast frame of burst 3 occurs at 4.0 s and thus is received by Client 1. Hence, where re-multicasting (or use of repeated bursts) is performed, the use of bursts and burst offsets allows misbehaving clients having a sleep interval greater than the sleep intervals addressed by the bursts, to receive the multicast frame.

While FIG. 7 deals with a specific DTIM interval, a specific re-multicast period, a specific burst number, a specific offset between bursts, and a client having a specific sleep interval, the method leading to FIG. 7 can be applied where any of these variables are adjusted. For instance, the above offset between bursts could be changed to 400 ms and Client 1 would still receive the multicast frame. However, it would receive the multicast frame at 3.0 s from the third consecutive multicast frame in the burst (the first occurring at 2.8 s, the second at 2.9 s, and the third at 3.0 s).

Figure 8:
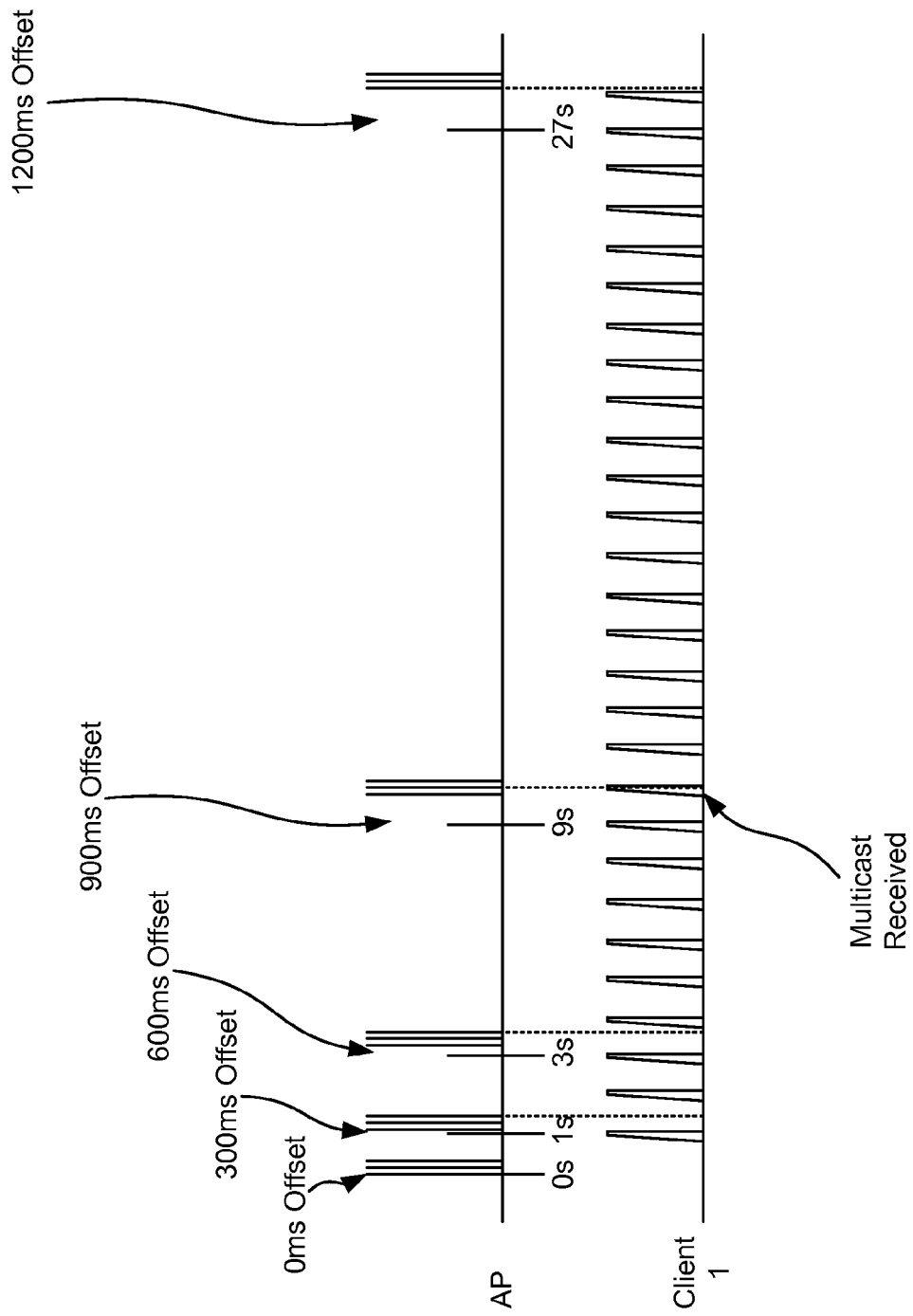
FIG. 8 shows re-multicasts (or use of repeated bursts) that occur according to a protocol for wireless discovery via multicast.

As another example, FIG. 8 shows re-multicasts (or use of repeated bursts) that occur according to a protocol for wireless discovery via multicast. In this case, the re-multicasts occur at exponentially increasing times (e.g., 0 s, 1 s, 3 s, 9 s, 27 s etc.). Again bursts having a burst number equal to three are used, the DTIM interval is one, Client 1 has a sleep interval of ten, multicasts in each burst occur every 100 ms, and the burst offset is again 300 ms (one will recognize that these example values are not limiting). Accordingly, Client 1 wakes every second. The multicasts in the first burst occur at 0 s, 0.1 s, and 0.2 s, the multicasts in the second burst occur at 1.3 s, 1.4 s, and 1.5 s, the multicasts in the third burst occur at 3.6 s, 3.7 s, and 3.8 s, the multicasts in the fourth burst occur at 9.9 s, 10.0 s, and 10.1 s. Since Client 1 awakes every second it is therefore awake for the second multicast frame of the fourth burst, at 10.0 s, and the multicast frame is therefore received. Continued bursts, for instance at 27 s and beyond, are not necessary in order for Client 1 to receive the multicast, although they may be carried out as per the re-multicast protocol. This example further demonstrates that any pattern of re-multicasts (or repeated bursts) known in the art can be combined with the burst and burst offset methods of this disclosure in order to increase the multicast reception rate for different clients having different sleep intervals.

Figure 9:
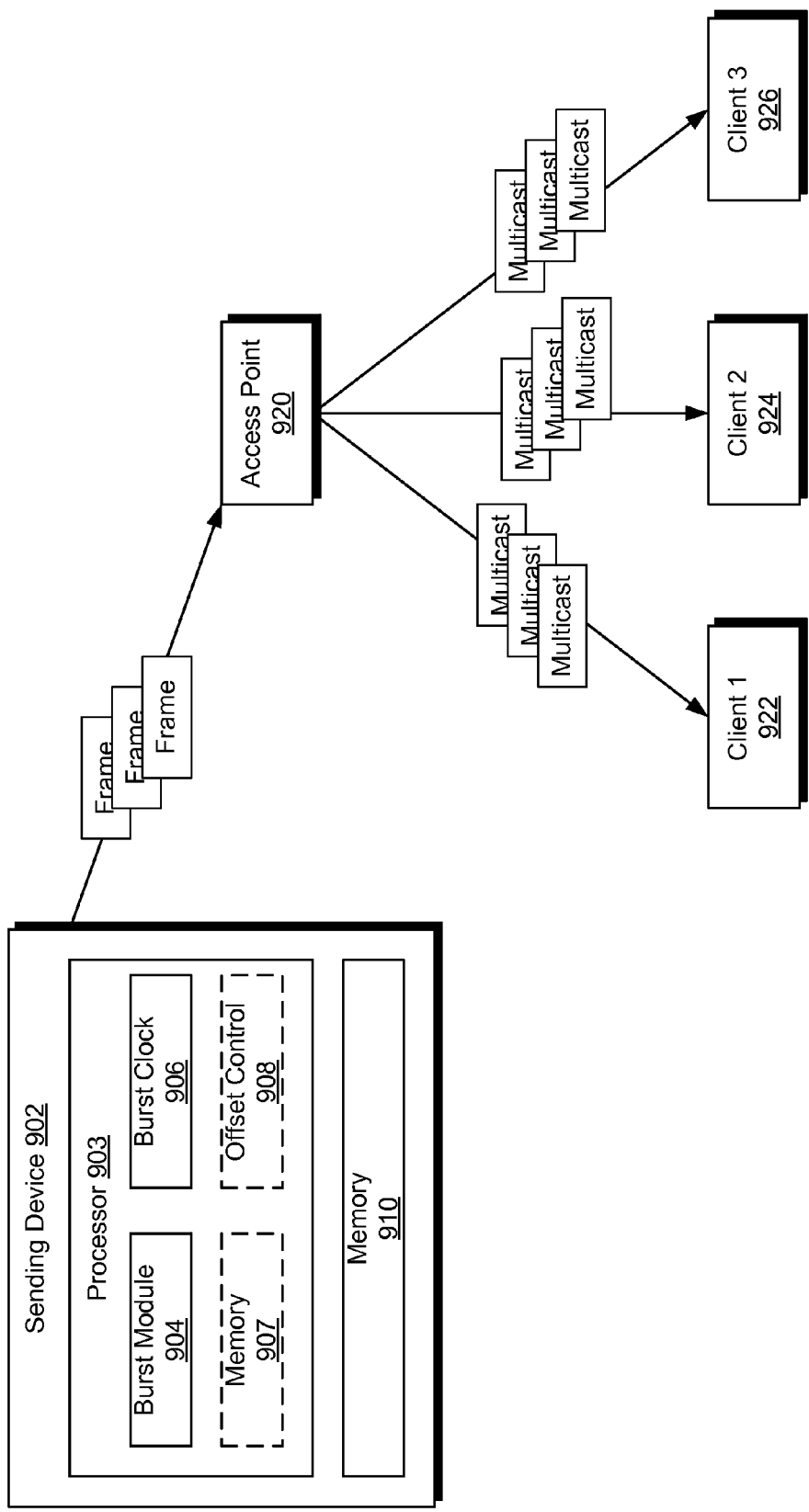
FIG. 9 illustrates a system where a sending device sends a repeated string of consecutive frames to an access point, which are then multicast by the access point effectively transmitting a burst of instances of the frame.

FIG. 9 illustrates a system where a sending device sends a repeated string of consecutive frames to an access point, which are then multicast by the access point effectively transmitting a burst of instances of the frame. A sending device 902 can send multiple repetitions of a multicast frame in a consecutive manner to an access point 920. The access point can then multicast the data from the sending device 902 and thereby provide a burst of a multicast of the frame from the sending device 902. The one or more of the multicasts in the burst can then be received by any of the client devices 922, 924, 926 listening for the multicast.

The sending device 902 may include logic, programming, or circuitry to achieve the above goals. For instance, the sending device 902 can include a processor 903 (e.g., an application processor) and a memory 910 (e.g., RAM). The processor 903 can control transmission of the repeated instances of the multicast frame. For instance, the processor 903 can include a burst module 904 that controls the burst number and the period between repeated transmissions to the access point 920. The burst module 904 can access the burst number from the memory 910, or from the optional memory 907 (e.g., a cache) of the processor 903. The burst clock 906 can provide a clock signal that the burst module 904 uses to control a period of transmission of the repeated instances of the frame. The burst clock 906 can be synchronized with a beacon period of the access point 920 either via communication with the access point 920 or via a predetermined period designed to be synchronous with the beacon period without needing communication with the access point 920. Where the burst clock 906 generates a clock signal having the same period (or a multiple thereof) as the beacon period, the clock signal can be in phase or out of phase from the beacon period. The processor 903 can access the frame from the memory 910 or from the optional memory 907.

Where the access point 920 performs re-multicasting (or repeated bursts) and an offset for each consecutive burst is used (e.g., FIGS. 7 and 8), the processor 903 may further include an optional offset control 908. The optional offset control 908 can select and control the offset of repeated bursts or re-multicasts of bursts. For instance, in FIGS. 7 and 8, where a 300 ms offset was used, the optional offset control 908 would access or retrieve the 300 ms offset from the memory 910 or from the optional memory 907 and provide instructions either directly to the access point 920, or via the burst module 904, to ensure that a 300 ms offset is applied to each consecutive burst.

Figure 10:
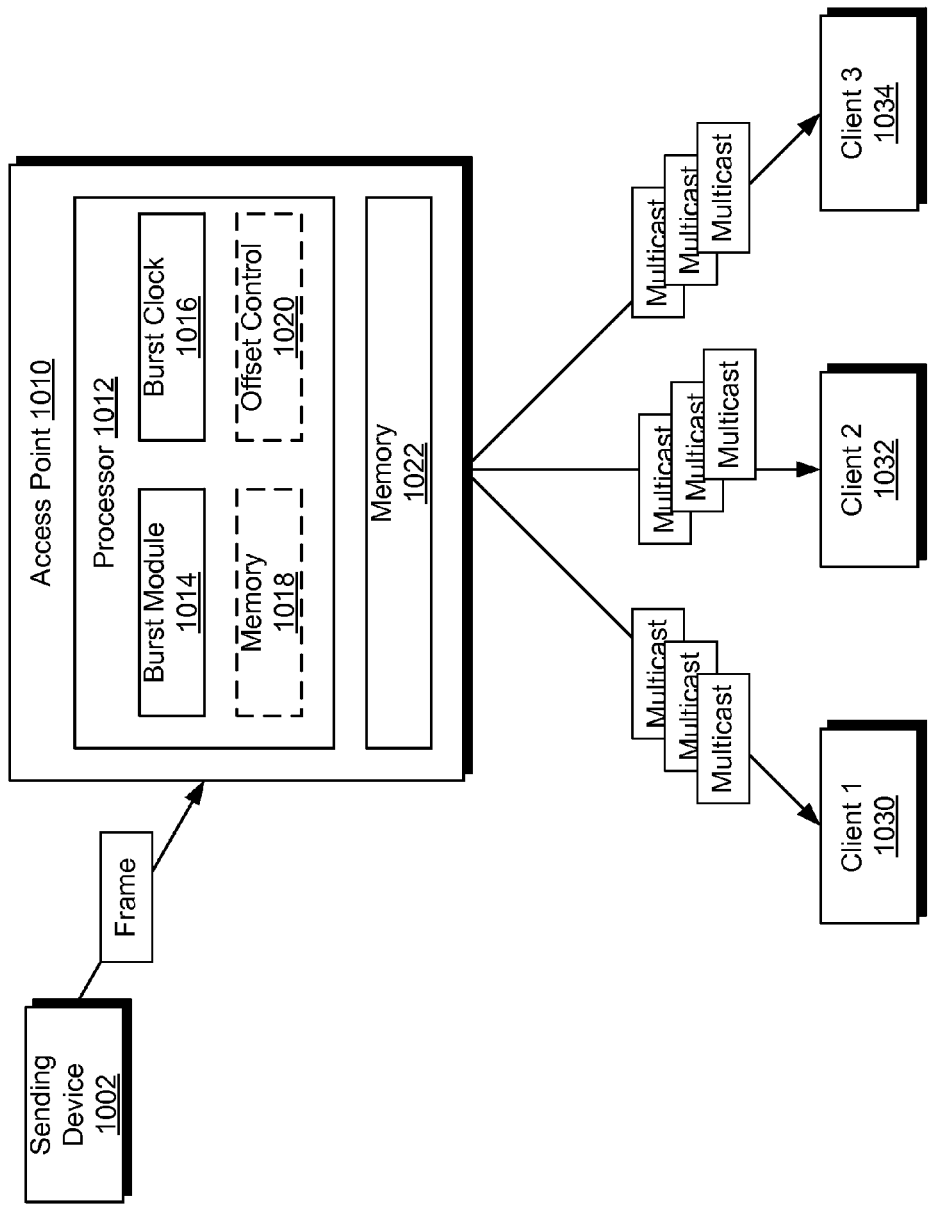
FIG. 10 illustrates a system where a sending device sends a single frame to an access point and the access point multicasts the frame in a burst of identical multicasts to clients.

FIG. 10 illustrates a system where a sending device sends a single frame to an access point and the access point multicasts the frame in a burst of identical multicasts to clients. A sending device 1002 can send a single frame to the access point 1010 to be transmitted to the clients 1030, 1032, 1034 via multicast. The access point 1010 can then generate a burst of multicast signals where each instance in the burst is sent after a consecutive DTIM. Where the DTIM interval is one, for example, the access point 1010 can send each instance of the burst after every beacon. Similarly, where the DTIM interval is three, for example, the access point 1010 can send the repetitive multicast every three beacons.

In some embodiments, the access point 1010 can include logic or programming to generate the burst from the single frame. The access point 1010 can include a processor 1012 (e.g., an application processor) and a memory 1022 (e.g., RAM). The processor 1012 can be responsible for controlling the multicasts and for performing the burst (i.e., taking a single frame sent from the sending device 1002 and multicasting the frame repeatedly for a number of times equal to a burst number). For instance, the processor 1012 can include a burst module 1014 that controls the burst number. The burst module 1014 can access the burst number from the memory 1022, or from an optional memory 1018 of the processor 1012 (e.g., a cache). The burst clock 1016 can provide a clock signal that the burst module 1014 uses to control a period of consecutive multicasts in each burst. The burst clock 1016 may be the same clock that controls the beacon and DTIM intervals. The frame can be stored in the memory 1022 or the optional memory 1018 and then multicast in the burst.

Where the access point 1010 repeats the burst and a different offset for each burst is used (e.g., FIGS. 7 and 8), the processor 1012 may further include an optional offset control 1020. The optional offset control 1020 selects and controls the offset for consecutive bursts. For instance, where an offset of 500 ms is used, the optional offset control 1020 can access or retrieve the 500 ms offset from the memory 1022 or the optional memory 1018 and provide instructions to enable a 500 ms offset between consecutive bursts. Alternatively, the optional offset control 1020 can provide a control signal to the burst module 1014 used to effect the offset for each consecutive burst.

Figure 11:
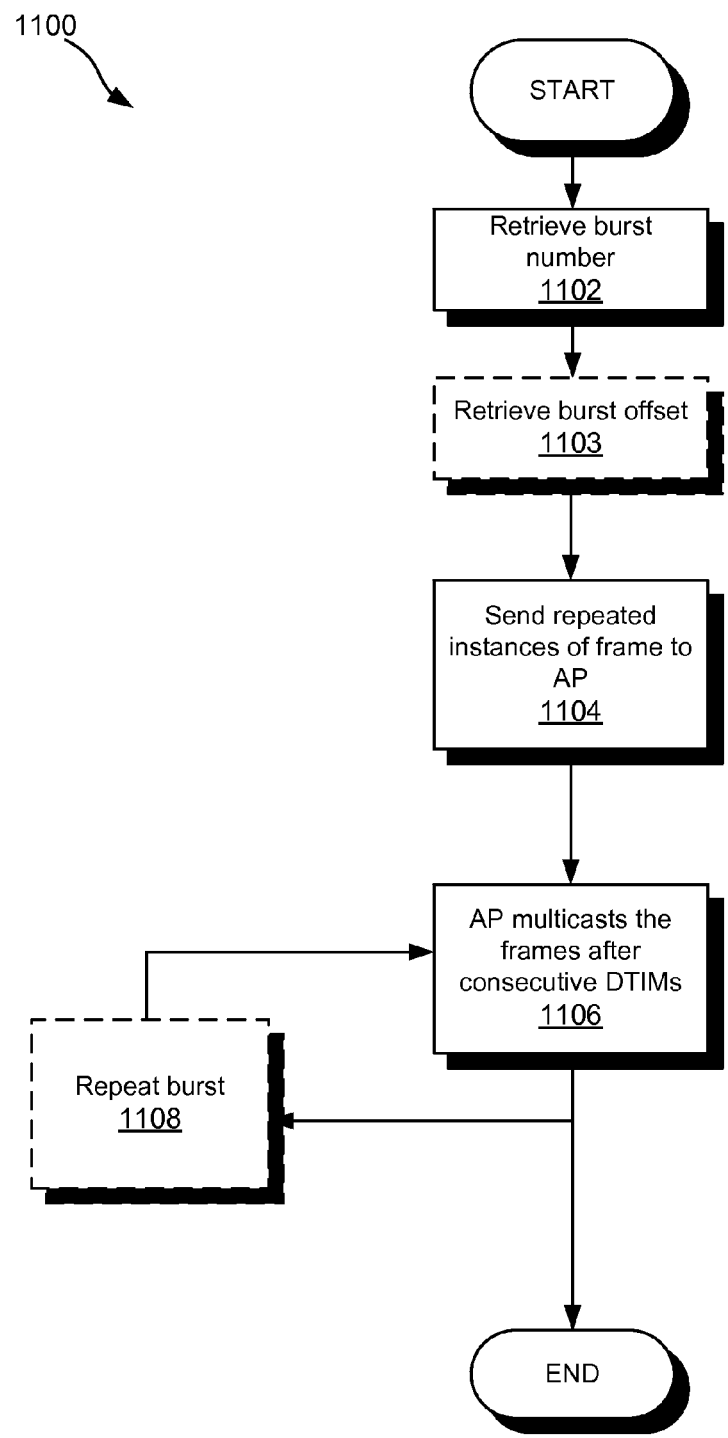
FIG. 11 is a first method for multicasting a frame sent by a sending device, where the second device is primarily responsible for the burst.

FIG. 11 is a first method for multicasting a frame sent by a sending device, where the second device is primarily responsible for the burst. In particular, the sending device sends the same frame to the access point multiple times, timed such that the access point multicasts each of the identical frames after consecutive DTIMs. The method 1100 begins with the sending device retrieving or accessing a burst number from internal memory (Block 1102). Once the burst number is known, the sending device can send repeated instances of the frame (the burst number of times) where the period of the sending can coincide with a beacon period or a DTIM interval (Block 1104), although in other embodiments, such synchronization can be handled by the access point instead. Where re-multicasting is to occur, the sending device may also retrieve a burst offset (optional Block 1103) and send repeated frames, with a multicast address as the destination, to the access point in accordance with the burst offset for each burst. Once the access point receives one or more of the repeated instances of the frame, and optionally the burst offset instructions, the access point can multicast the frame, and the multicast is repeated during consecutive DTIM intervals as the frames' arrivals are timed to occur once per DTIM interval (Block 1106). This effectively results in a burst even though the access point may be a blind relay for the frames from the sending device. Further, if re-multicasting is called for, then the burst can be repeated with an interval that accords with a protocol as modified by the offset (optional Block 1108). In some instances, the access point can comprise logic to control the repeats of the burst, while in others the sending device may provide instructions to the access point to perform repeated transmissions of the string of frames that the sending device passes to the access point.

Figure 12:
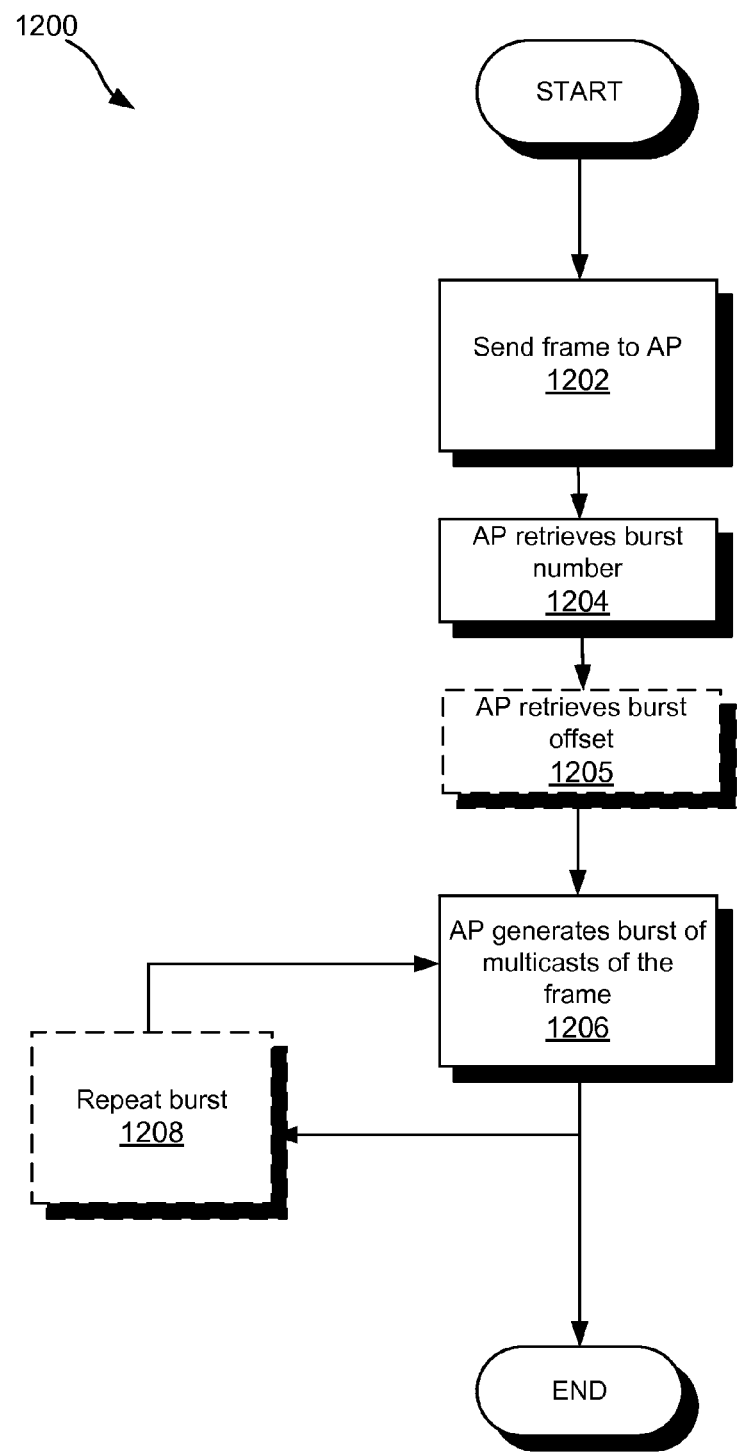
FIG. 12 is a second method for multicasting a frame sent by a sending device, where the access point is primarily responsible for the burst.

FIG. 12 is a second method for multicasting a frame sent by a sending device, where the access point is primarily responsible for the burst. In particular, the sending device provides a single frame to the access point and the access point repeatedly transmits the frame in multicast over consecutive DTIM intervals as a burst. The method 1200 begins with the sending device sending a frame to the access point (Block 1202). Here, the sending device need not have any knowledge of bursts or provide any instructions related to multicasting a burst. Once the frame is in a memory of the access point, the access point can determine that a burst is to take place and can retrieve a burst number (Block 1204). Retrieving can include retrieving the burst number from a memory of the access point or receiving a data indicator of the burst number from an external device such as the sending device. If re-multicasting is to be performed, the access point can also retrieve a burst offset (optional Block 1205). The access point can then multicast the frame once after each of multiple consecutive DTIM intervals thereby providing a burst (Block 1206). Where re-multicasting (or repeated bursts) is used (optional Block 1208), consecutive bursts can be transmitted where an interval between bursts may be controlled by a protocol. For instance, the start of each burst can be triggered by a DTIM interval or a multiple of the DTIM interval. In some instances, the interval may be an escalating interval where each subsequent burst is offset from a start time indicated by the protocol, by an offset (e.g., FIGS. 7-8).

The method blocks shown in FIGS. 11 and 12 are not limited to the illustrated order of blocks and can be reordered without departing from the spirit or scope of this disclosure.

For the purposes of this disclosure, an inherent multicast loss describes losses of frames due to inherent inefficiencies in the multicast process. For instance, even where a client does not sleep and is thus always awake for DTIMs, around 10% of multicasts are not received. Thus, there is around a 10% loss of transmitted frames in addition to losses caused by clients being asleep during one or more DTIMs (i.e, a 10% inherent multicast loss).

For the purposes of this disclosure, an access point is a device that receives a frame from a sending device and multicasts the frame to a plurality of clients. The multicast can be wired or wireless. A Wi-Fi router is one non-limiting example of an access point. As another example, a smartphone can be an access point where the smartphone is used as a source of BLUETOOTH or as a Wi-Fi hotspot or is part of a mesh network. Components in a mesh network such as ZIGBEE or ZWAVE devices can be an access point. An access point can be integral with or coupled to a router. The access point may interface between a wireless and wired network.

For the purposes of this disclosure, a client is a device that receives multicast traffic. A client may be part of a network with the access point, for instance a local area network (LAN). A client may be able to enter a sleep mode, wherein it is unable to receive multicasts while asleep. A smartphone or tablet computer are both non-limiting examples of a client device.

For the purposes of this disclosure, a re-multicast is the multicast of a frame that was already recently sent out via multicast, where an interval between re-multicasts is set according to a protocol. Re-multicasting a burst means the repeated transmission of a burst of multicasts where the first instance of the multicast in each burst starts at a time determined by a protocol (and optionally with the addition of an offset to each start time determined by the protocol).

Figure 13:
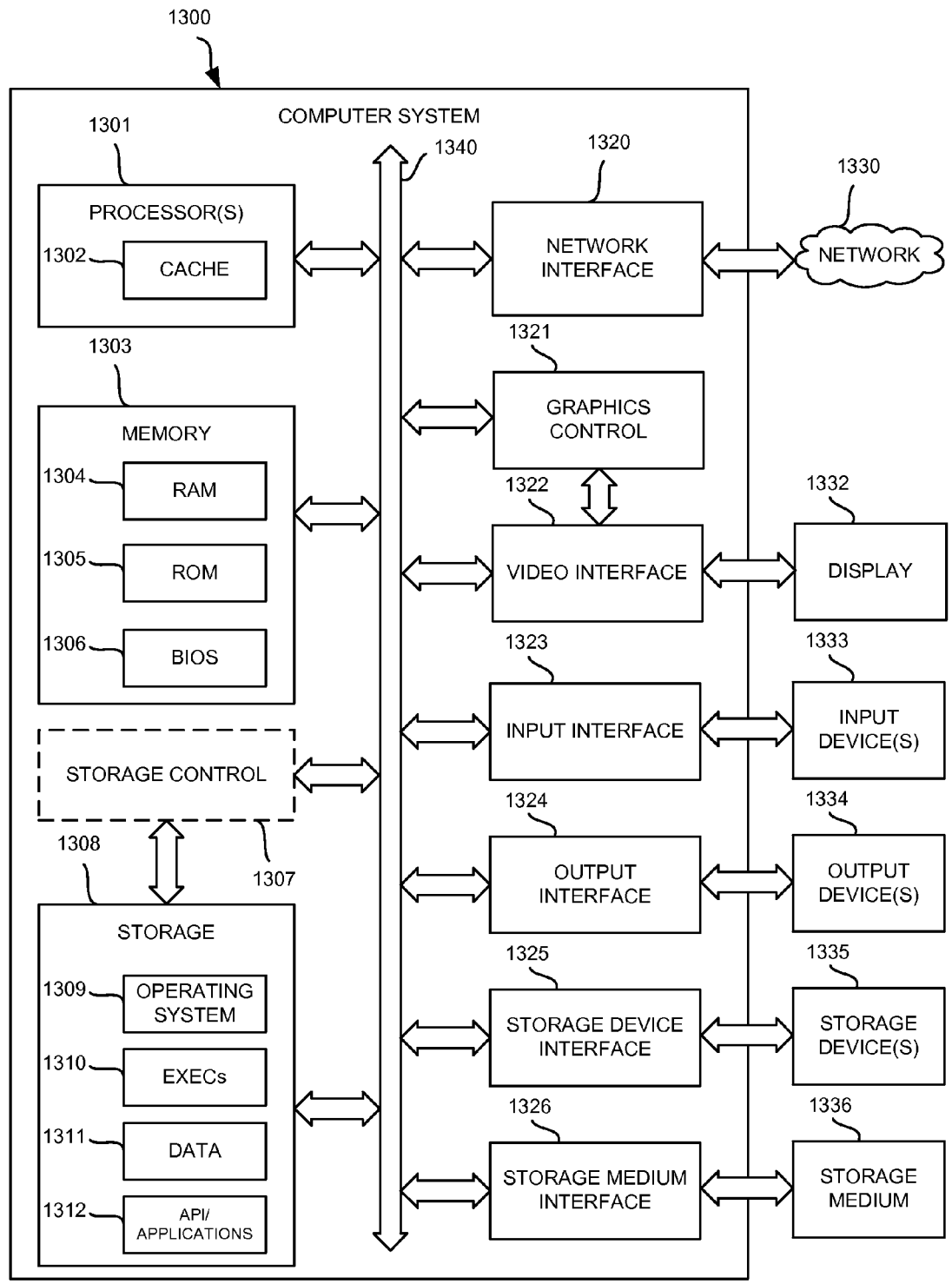
FIG. 13 shows a diagrammatic representation of an embodiment of a computer system for implementing the systems, methods, and apparatuses described in this disclosure.

The systems and methods described herein can be implemented in a computer system in addition to the specific physical devices described herein. FIG. 13 shows a diagrammatic representation of an embodiment of a computer system 1300 within which a set of instructions can execute for causing a device to perform or execute any one or more of the aspects and/or methodologies of the present disclosure. The sending devices, access points, and clients in FIGS. 9-12 are examples of different implementations of the computer system 1300. The components in FIG. 13 are examples only and do not limit the scope of use or functionality of any hardware, software, firmware, embedded logic component, or a combination of two or more such components implementing particular embodiments of this disclosure. Some or all of the illustrated components can be part of the computer system 1300. For instance, the computer system 1300 can be a general purpose computer (e.g., a laptop computer) or an embedded logic device (e.g., an FPGA), to name just two non-limiting examples.

Computer system 1300 includes at least a processor 1301 such as a central processing unit (CPU) or an FPGA to name two non-limiting examples. The processors 903 and 1012 in FIGS. 9 and 10 are two implementations of the processor 1301. The computer system 1300 may also comprise a memory 1303 and a storage 1308, both communicating with each other, and with other components, via a bus 1340. Some examples of implementations of the memory 1303 include the memory 1022 and 1018 in FIG. 10 and the memory 1022 and 1018 in FIG. 10. The bus 1340 may also link a display 1332, one or more input devices 1333 (which may, for example, include a keypad, a keyboard, a mouse, a stylus, etc.), one or more output devices 1334, one or more storage devices 1335, and various non-transitory, tangible computer-readable storage media 1336 with each other and with one or more of the processor 1301, the memory 1303, and the storage 1308. All of these elements may interface directly or via one or more interfaces or adaptors to the bus 1340. For instance, the various non-transitory, tangible computer-readable storage media 1336 can interface with the bus 1340 via storage medium interface 1326. Computer system 1300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Processor(s) 1301 (or central processing unit(s) (CPU(s))) optionally contains a cache memory unit 1302 for temporary local storage of instructions, data, or computer addresses. Processor(s) 1301 are configured to assist in execution of computer-readable instructions stored on at least one non-transitory, tangible computer-readable storage medium. Computer system 1300 may provide functionality as a result of the processor(s) 1301 executing software embodied in one or more non-transitory, tangible computer-readable storage media, such as memory 1303, storage 1308, storage devices 1335, and/or storage medium 1336 (e.g., read only memory (ROM)). For instance, the methods 1100 and 1200 in FIGS. 11 and 12, respectively, may be embodied in one or more non-transitory, tangible computer-readable storage media. The non-transitory, tangible computer-readable storage media may store software that implements particular embodiments, such as the methods 1100 and 1200, and processor(s) 1301 may execute the software. Memory 1303 may read the software from one or more other non-transitory, tangible computer-readable storage media (such as mass storage device(s) 1335, 1336) or from one or more other sources through a suitable interface, such as network interface 1320. The sending device 902 and the access point 920 may communicate via embodiments of the network interface 1320 residing in both the sending device 902 and the access point 920. The software may cause processor(s) 1301 to carry out one or more processes or one or more steps of one or more processes described or illustrated herein. Carrying out such processes or steps may include defining data structures stored in memory 1303 and modifying the data structures as directed by the software. In some embodiments, an FPGA can store instructions for carrying out functionality as described in this disclosure (e.g., the methods 1100 and 1200). In other embodiments, firmware includes instructions for carrying out functionality as described in this disclosure (e.g., the methods 1100 and 1200).

The memory 1303 may include various components (e.g., non-transitory, tangible computer-readable storage media) including, but not limited to, a random access memory component (e.g., RAM 1304) (e.g., a static RAM "SRAM", a dynamic RAM "DRAM, etc.), a read-only component (e.g., ROM 1305), and any combinations thereof. ROM 1305 may act to communicate data and instructions unidirectionally to processor(s) 1301, and RAM 1304 may act to communicate data and instructions bidirectionally with processor(s) 1301. ROM 1305 and RAM 1304 may include any suitable non-transitory, tangible computer-readable storage media described below. In some instances, ROM 1305 and RAM 1304 include non-transitory, tangible computer-readable storage media for carrying out the methods 1100 and 1200. In one example, a basic input/output system 1306 (BIOS), including basic routines that help to transfer information between elements within computer system 1300, such as during start-up, may be stored in the memory 1303.

Fixed storage 1308 is connected bidirectionally to processor(s) 1301, optionally through storage control unit 1307. Fixed storage 1308 provides additional data storage capacity and may also include any suitable non-transitory, tangible computer-readable media described herein. Storage 1308 may be used to store operating system 1309, EXECs 1310 (executables), data 1311, API applications 1312 (application programs), and the like. For instance, the storage 1308 could be implemented for storage of burst numbers as described in various figures in this disclosure. Often, although not always, storage 1308 is a secondary storage medium (such as a hard disk) that is slower than primary storage (e.g., memory 1303). Storage 1308 can also include an optical disk drive, a solid-state memory device (e.g., flash-based systems), or a combination of any of the above. Information in storage 1308 may, in appropriate cases, be incorporated as virtual memory in memory 1303.

In one example, storage device(s) 1335 may be removably interfaced with computer system 1300 (e.g., via an external port connector (not shown)) via a storage device interface 1325. Particularly, storage device(s) 1335 and an associated machine-readable medium may provide nonvolatile and/or volatile storage of machine-readable instructions, data structures, program modules, and/or other data for the computer system 1300. In one example, software may reside, completely or partially, within a machine-readable medium on storage device(s) 1335. In another example, software may reside, completely or partially, within processor(s) 1301.

Bus 1340 connects a wide variety of subsystems. Herein, reference to a bus may encompass one or more digital signal lines serving a common function, where appropriate. Bus 1340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1300 may also include an input device 1333. In one example, a user of computer system 1300 may enter commands and/or other information into computer system 1300 via input device(s) 1333. Examples of an input device(s) 1333 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1333 may be interfaced to bus 1340 via any of a variety of input interfaces 1323 (e.g., input interface 1323) including, but not limited to, serial, parallel, game port, USB, FIREWIRE, THUNDERBOLT, or any combination of the above.

In particular embodiments, when computer system 1300 is connected to network 1330 (such as a network comprising the access point 920 and the clients 922, 924, and 926 in FIG. 9), computer system 1300 may communicate with other devices, such as mobile devices and enterprise systems, connected to network 1330. Communications to and from computer system 1300 may be sent through network interface 1320. For example, network interface 1320 may receive incoming communications (such as requests or responses from other devices) in the form of one or more packets (such as Internet Protocol (IP) packets) from network 1330, and computer system 1300 may store the incoming communications in memory 1303 for processing. Computer system 1300 may similarly store outgoing communications (such as requests or responses to other devices) in the form of one or more packets in memory 1303 and communicated to network 1330 from network interface 1320. Processor(s) 1301 may access these communication packets stored in memory 1303 for processing.

Examples of the network interface 1320 include, but are not limited to, a network interface card, a modem, and any combination thereof. Examples of a network 1330 or network segment 1330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, the network comprising access point 1010 and clients 1030, 1032, and 1034 is one example of an implementation of the network 1330. A network, such as network 1330, may employ a wired and/or a wireless mode of communication. In general, any network topology may be used.

Information and data can be displayed through a display 1332. Examples of a display 1332 include, but are not limited to, a liquid crystal display (LCD), an organic liquid crystal display (OLED), a cathode ray tube (CRT), a plasma display, and any combinations thereof. The display 1332 can interface to the processor(s) 1301, memory 1303, and fixed storage 1308, as well as other devices, such as input device(s) 1333, via the bus 1340. The display 1332 is linked to the bus 1340 via a video interface 1322, and transport of data between the display 1332 and the bus 1340 can be controlled via the graphics control 1321.

In addition to a display 1332, computer system 1300 may include one or more other peripheral output devices 1334 including, but not limited to, an audio speaker, a printer, and any combinations thereof. Such peripheral output devices may be connected to the bus 1340 via an output interface 1324. Examples of an output interface 1324 include, but are not limited to, a serial port, a parallel connection, a USB port, a FIREWIRE port, a THUNDERBOLT port, and any combinations thereof.

In addition or as an alternative, computer system 1300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 1100 and 1200) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An example non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system configured to control multicasting, the system comprising:
a network interface configured to transmit a frame;
a memory configured to store the frame and a burst number;
a burst module in communication with the memory and the network interface and configured to cause a burst of multicasts of the frame from an access point, each one of the multicasts timed to occur between consecutive delivery traffic indication messages (DTIMs) sent from the access point, the number of multicasts in the burst equal to the burst number; and
an offset module configured to cause repeated instances of the burst where consecutive instances of the burst are separated by an increasing offset, and wherein at least one of the clients has a sleep interval greater than or equal to the burst number.

2. The apparatus of claim 1, wherein the DTIM is multicast according to a DTIM interval, and wherein at least one client listening for the multicasts sleeps for a sleep interval greater than the DTIM interval.

3. The apparatus of claim 2, wherein the burst number is equal to three.

4. The apparatus of claim 1, wherein the apparatus is a sending device configured to pass consecutive duplicate instances of the same frame to the access point timed so that the access point generates a burst of a multicast of the frame, and wherein the access point is a blind relay for the consecutive frames.

5. The apparatus of claim 1, wherein the apparatus is the access point, and wherein the network interface is configured to transmit the frame in multicast.

6. A method for multicasting, the method comprising:
receiving a frame at an access point, where the frame is to be multicast to a group of clients in a network comprising at least the clients and the access point;
accessing a burst number from a memory;
multicasting a plurality of delivery traffic indication messages (DTIMs) spaced by a DTIM interval;
repeatedly multicasting a burst of the frame by multicasting the frame once after each of at least two DTIMs, where a number of multicast instances in the burst is equal to the burst number, and wherein consecutive instances of the burst are separated by an increasing offset, and wherein at least one client in the group of clients has a sleep interval greater than or equal to the burst number.

7. The method of claim 6, wherein at least one client listening for the multicasting sleeps for a sleep interval greater than the DTIM interval.

8. The method of claim 7, further comprising selecting the burst number to equal or exceed a common range of sleep intervals for the group of clients.

9. The method of claim 8, wherein the burst number is three.

10. The method of claim 6, wherein the memory is of a sending device configured to send the frame to the access point.

11. The method of claim 6, wherein the burst number is accessed from a memory of the access point.

12. A non-transitory, tangible computer readable storage medium, encoded with processor readable instructions to perform a method for multicasting, the method comprising:
sending a frame to an access point, where the frame is to be multicast to a group of clients in a network comprising at least the clients and the access point;
accessing a burst number from a memory;
multicasting a plurality of delivery traffic indication messages (DTIMs) according to a DTIM interval from the access point;
multicasting a burst of the frame by multicasting the frame from the access point once after each of at least two DTIMs, where a number of multicast instances in the burst is equal to the burst number; and
repeatedly multicasting the burst, where consecutive instances of the burst are separated by an increasing offset, and wherein at least one client in the group of clients has a sleep interval greater than or equal to the burst number.

13. The non-transitory, tangible computer readable storage medium of claim 12, wherein at least one client in the group of clients sleeps for a sleep interval greater than the DTIM interval.

14. The non-transitory, tangible computer readable storage medium of claim 12, further comprising selecting the burst number to equal or exceed a common range of sleep intervals for the group of clients.

15. The non-transitory, tangible computer readable storage medium of claim 12, wherein the burst number is accessed from a memory of a sending device.

16. The non-transitory, tangible computer readable storage medium of claim 12, wherein the burst number is accessed from a memory of the access point.

* * * * *